3,109,774
ERYTHROPOIETIC FACTOR PREPARATION
Wilfrid F. White, Lombard, and Gotthard W. Weber, Chicago, Ill., assignors, by mesne assignments, to the United States of America as represented by the United States Atomic Energy Commission
No Drawing. Filed June 12, 1958, Ser. No. 741,471
8 Claims. (Cl. 167—74)

This invention relates to the preparation of erythropoietic factor concentrates. More particularly this invention relates to a method of obtaining an active extract of a plasma erythropoietic factor by contact with ion exchange materials.

The existence of a plasma erythropoietic factor that is stimulatory to erythropoiesis in animals, including man, is firmly established. The presence, for example, of such a factor in the blood of human subjects afflicted with Cooley's anemia and sickle-cell anemia has been demonstrated by introducing into laboratory animals blood serum obtained from these individuals. The serum was found to produce a significant augmentation in peripheral red cell, hemoglobin and reticulocyte levels of the test animals. A similar result was elicited with blood serum from patients having polycythemia vera. More dramatic substantiation of the existance of a plasma erythropoietic factor has been evidenced in extensive studies employing plasma of animals with induced anemia.

The presence of this substance in the plasma of anemic and polycythemic subjects has spurred investigation into the possibility of its utilization in the treatment of blood dyscrasias in animals. This goal has led to an intensive search for a method of preparing an erythropoietic factor of high titer manifesting increased activity.

Work in this direction has produced an accumulated body of evidence which indicates that the factor is heat stable, and is not precipitated by perchloric acid. These properties of the plasma erythropoietic factor have been utilized almost universally by investigators in their efforts to obtain a substance having the desired activity. Methods employing either heat, or the acid, however, have failed to achieve this end. In each instance they have yielded a high volume, low activity filtrate unsuited for clinical assay procedures. In addition to this disadvantage, use of these agents is undesirable in certain other respects. The obvious danger involved in working with perchloric acid need not be dwelled upon. Boiling of the plasma, on the other hand, although safer than the perchloric acid method, results in a loss of as much as 70% of the activity and produces a substance which fails to give a uniform response. Moreover, boiling, like protein precipitation with perchloric acid, renders the remainder of the plasma useless.

From this it may be seen that there is a demand for a more practical process for preparing plasma erythropoietic factor concentrates. It is, therefore, an object of the present invention to provide a simple and highly efficient method of preparing plasma erythropoietic factor concentrates. Another object of this invention is to provide a process in which a plasma erythropoietic factor of high titer and enhanced activity is obtained from a crude solution by sorption on a particularly effective sorption agent, and the factor subsequently extracted from the sorption agent in concentrated form. A still further object of this invention is to provide a cell-free preparation for treating anemia which can be prepared from an animal of a different species than the one being treated. Other specific objects and advantages of the invention will appear as the specification proceeds.

We have discovered that a solution of anemic plasma may be treated effectively to produce a plasma erythropoietic factor concentrate by contacting the solution under proper conditions of salt concentration and pH with an ion exchange material to cause sorption of the factor on the ionic exchanger, and thereafter eluting the factor from the exchanger with a suitable desorption agent. The concentrate thus obtained may be utilized immediately or preserved for subsequent use.

In the practice of the present invention the preferred starting material is anemic plasma which may be obtained from ovine, bovine, porcine or other mammalian sources. Although plasma from any of these sources can be employed in the process, we prefer to use anemic sheep plasma. Anemia may be induced in the animals in one of several methods among which are sublethal irradiation, hemorrhage, subjugation to a hypoxic atmosphere, or injection of either a hemolytic or polycythemic agent. For the purposes of this invention, the latter method is the more effective and preferred manner of evoking the production of the erythropoietic stimulating factor. A hemolytic agent such as phenylhydrazine hydrochloride or a polycythemic agent such as cobalt chloride are particularly desirable in that they induce rapid generation of the plasma erythropoietic factor in the animal and permit reconstitution of the plasma enabling it to be used in other clinical operations. Of the two preferred agents, phenylhydrazinized animals are found to be more productive and to give substantially larger volumes of plasma than cobalt treated animals. The cobalt chloride induces production of erythrocytes which tends to decrease yields of plasma.

In the preferred practice of this invention, animals injected with phenylhydrazine hydrochloride are usually exsanguinated when the hematocrit is about 25 and preferably between about 16.0 to about 8.0. The hematocrit is a measure of the relative volume occupied by the erythrocytes in the blood and is an excellent guide in determining when the plasma erythropoietic factor has reached its optimum level. The blood of the animal may be withdrawn by conventional aseptic methods directly into a suitable anti-coagulant solution containing either heparin, citrate, or versene. Thereafter, separation of the erythrocytes from the plasma is generally effected by centrifugation.

Although the sequence of the initial steps in the process is not critical, it is preferred at this stage to adjust the pH of the plasma with an acid such as hydrochloric, sulfuric, phosphoric, formic, lactic, citric, benzoic, etc. The quantity of activity adsorbed on the ion exchange material bears a direct relation to the pH of the plasma. At a very low pH, for example, the capacity of the exchanger to hold the activity is lowered. At the other extreme, unfavorable quantities of solids are retained on the exchanger along with the activity thereby necessitating an added purification step. In accordance with the practice of this process, satisfactory results may be obtained with a pH in the range from about 3.5 to about 8.5. However, a pH range from about 4.0 to about 6.0 is preferred, with optimum retention of activity being realized at a pH range of from about 4.2 to about 4.8. The latter range results in a minimum amount of solids with a maximum potency of the desired factor.

Following adjustment of the pH, a precipitate generally forms which may be separated from the clear plasma solution by centrifugation or filtration. The solution is then preferably diluted or dialyzed to bring about a preferred volume ratio of about one part plasma to about three parts water. This operation accomplishes a desired adjustment in the salt concentration of the plasma which may range from about 0.01 molar to about 0.06 molar. Although activity is retained by the ion exchange material within this range, the preferred salt concentration is about 0.03 molar to about 0.04 molar, with optimum results being achieved at a salt concentration of about 0.0375 molar. Any precipitate formed after this operation may be removed by conventional methods. The plasma solution is now ready for contact with the ion exchange material.

The advantages of this invention may be achieved with any insoluble open-chain high molecular polymer containing ion exchange groups. However, better results are obtained with an insoluble, high molecular polysaccharide containing ion exchange groups. This insoluble polysaccharide ion exchanger may be derived from a polysaccharide of vegetable, animal or bacterial origin, which polysaccharide can be of either the structural or nutrient type. Thus, this polysaccharide ion exchanger may be a suitable derivative of such vegetable nutrient polysaccharides as starches, e.g. amylose and amylopectic, and inulins; such vegetable structural polysaccharides as cellulose, e.g. alpha cellulose, and oxycellulose, xylans, pectins and algins; such animal polysaccharides and glycogens, chitins and muco polysaccharides, e.g. chondroitin sulfuric acid, heparin and hyaluronic acid; and such bacterial polysaccharides as levans and dextrans. An especially desirable polysaccharide ion exchanger can be derived from such alpha cellulose as paper, cotton, wood pulp, cotton cloth, etc.

The ion exchange groups contained in these open-chain high molecular polymers may be either basic (anionic exchangers) or acidic (cationic exchangers). Examples of cellulose anion exchangers are the dimethyl amino ethyl ether of cellulose and the diethyl amino ethyl ether of cellulose. These exemplary cellulose anion exchangers can be prepared by condensing sodium cellulose with 2-chloro-N,N-dimethylethylamine or 2-chlorotriethylamine, respectively. Examples of cellulose cation exchangers are carboxymethyl cellulose, cellulose citrate and cellulose phosphate. The carboxymethyl cellulose is available commercially, while cellulose citrate can be prepared by esterifying an alpha cellulose with citric acid. This preferred ion exchange material should demonstrate the following properties from a practical consideration: (1) It should not be soluble in the plasma solution; (2) it should not be destructive or detrimental to the erythropoietic factor; and (3) it should not sorb other fractions of the plasma to the exclusion of the plasma erythropoietic factor.

In accordance with the practice of this invention, contact between the ion exchange material and the anemic plasma solution may be accomplished in a batch or column operation. A particularly desirable result is achieved when the ion exchange material is introduced into the plasma solution and the mixture agitated. This preferred method not only efficiently places the activity on the exchanger but results in a considerable savings of time. The quantity of exchange material per unit volume of plasma may vary over a wide range. From a practical and economic standpoint it is preferred that about 10 grams of the ion exchange material be employed per liter of plasma solution.

Before introducing the ion exchange material into the plasma solution it is preferred that the conditions of salt concentration and pH of the exchange material be substantially equilibrated to that of the plasma solution. This may be achieved with any suitably buffered acid-salt solution. An example of such a buffer solution is one containing about a 0.02 to about a 0.03 molar concentration of sodium phosphate and about a 0.03 to about a 0.04 molar concentration of sodium chloride.

The sorption step may be carried out for a period of from about fifteen minutes to about one and one-half hours after which time the exchange material is separated from the solution, washed, preferably vacuum filtered and resuspended in the acid-salt buffer solution. The elution of the plasma erythropoietic factor from the ion exchange material, like the sorption procedure, may be performed in a batch or column operation. The column technique involves settling or packing the ion exchange material into a preferably cylindrical body, and passing a pre-prepared desorption agent through the column. To achieve the purposes of this invention it is preferred that the elution be accomplished with a suitably buffered, substantially high-salt-concentration solution. An example of such a solution is one having a sodium chloride concentration of from about 0.1 molar to about 0.5 molar and a sodium phosphate concentration of about 0.05 to about 0.2 molar. An eluant of this concentration produces a highly favorable result in a column operation in that it rapidly elutes the desired factor from the ion exchange material in the least amount of time with a minimum volume of eluate. In a batchwise operation it reduces the number of washings necessary to desorb the activity.

We have found that the optical density of the effluent liquid provides a convenient method for determining the point at which substantially all of the activity has been desorbed from the ion exchange material. Elution is generally discontinued when the optical density of the eluate falls below 0.1 at 280 mu (Beckman spectrophotometer).

The eluate containing the plasma erythropoietic factor concentrate may be utilized immediately. However, if it is desired to store the concentrate for subsequent use, the eluate may be dialyzed and then lyophilized without impairment of the activity of the factor.

The process of this invention has enabled the reduction in volume of the original starting material from about 20 liters to about 1 liter, an accomplishment heretofore unrealized with conventional methods. The plasma erythropoietic factor concentrates thus obtained are of extreme value in clinical assay procedures and enable rapid and positive results to be elicited.

The method has the further advantage of permitting the ion exchange material to be regenerated after each completed operation. It is thus possible to utilize the same exchanger indefinitely resulting in substantial savings in materials and labor.

Specific examples of the process may be set out as follows:

Example I

The pH of 25.0 liters of plasma obtained from phenylhydrazinized sheep was adjusted from 9.2 to 4.5 with 5 N HCl with stirring. The precipitate formed was separated by centrifugation. The clear plasma was dialyzed overnight against 75 liters of cold distilled water at 4° C. to obtain a volume ratio of approximately one part plasma to three parts water. After bringing the solution to room temperature, there were added 300 grams of a moist ionic exchange material essentially comprising the condensation product of sodium cellulose and 2-chlorotriethylamine previously equilibrated to a pH of 4.5 with a buffer solution of 0.025 molar sodium phosphate and 0.0375 molar sodium chloride. The mixture was agitated for one and one-half hours at room temperature and then filtered on a 16″ Büchner funnel. The ionic exchange material was washed with the same buffer solution until the filtrate reached an optical density below 0.050 at 280 mu (Beckman spectrophotometer). The moist ionic exchange material was then slurried with the buffer solution into a 4″ column and allowed to settle. Elution was started with a solution of 0.1 molar sodium phosphate and 0.5 molar sodium chloride. The eluate was collected until the optical density fell below 0.1 at 280 mu. The eluate, totalling 2500 ml., was adjusted to a pH of 7.0 with 5 N NaOH. Analysis on the spectrophotometer at 280 mu indicated 12,500 units of the activity had been eluted. The eluate was dialyzed against 100 liters of cold distilled water for 24 hours, followed by lyophilization. The yield was 13.2 grams of the factor concentrate.

*Example II*

Male Sprague-Dawley rats weighing between 125 grams to 150 grams were starved for 30 hours prior to an assay with the product obtained in accordance with procedure of Example I. The average weight of the rats at the start of the test was 138 grams. Six rats were used per assay level. Prepared samples of the filtrate from Example I and the product were administered intravenously in 2 ml. volumes on the first and second day of the assay. Control animals received normal saline according to the same schedule. As a reference, polycythemia was induced in one group of rats by subcutaneous injection of 2 ml. of cobalt chloride at a concentration of 5 micro-molar per ml. on each day. On the third day one ml. of a standard radio-iron ($Fe^{59}$) solution having a concentration of one micro-curie per ml. was introduced by subcutaneous injection. On the fourth day, sixteen hours after the administration of the radio-iron solution, the rats were sacrificed and one ml. samples of blood were collected by cardiac puncture. The radio activity of the $Fe^{59}$ in the samples was determined by counting in a well-type scintillation counter. Percent uptake of $Fe^{59}$ was calculated by the following formula:

$$\frac{\text{Counts per minute net} \times \text{body weight in grams}}{\text{Standard } (0.2 \text{ ml.} \times 5)} \times 5\% \text{ (percent of blood compared to body wt.)}$$

Values for the example run are tabulated below:

| | Percent |
|---|---|
| Starting material @ 4 ml. plasma equivalent per animal | 5.1 |
| Filtrate @ 4 ml. plasma equivalent per animal | 2.0 |
| Eluate @ 4 ml. plasma equivalent per animal | 3.7 |
| Cobalt standard @ 4 ml. plasma equivalent per animal | 4.0 |

These values indicate a recovery of activity in the eluate of approximately 72%.

While in the foregoing description we have set out steps of the process in considerable detail for the purpose of illustrating embodiments of the invention, it will be understood that such details may be varied widely by those skilled in the art without departing from the spirit of this invention.

We claim:

1. In a process for preparing an erythropoietic factor concentrate, the steps of obtaining an active extract of the factor from a solution of blood plasma having a pH from about 4.0 to about 6.0 by sorption only of the factor on an insoluble substantially open-chain, high molecular polysaccharide containing ionic exchange groups, and eluting said factor from said high molecular polysaccharide with a desorption solution having a sodium chloride concentration of from about 0.1 molar to 0.5 molar and a sodium phosphate concentration of from about 0.05 molar to about 0.2 molar.

2. In a process for preparing an erythropoietic factor concentrate, the steps of obtaining an active extract of the factor from a solution of blood plasma having a pH from about 4.0 to about 6.0 and an alkali metal salt concentration of from 0.01 molar to about 0.06 molar by sorption only of the factor on an insoluble substantially open-chain, high molecular polysaccharide containing ionic exchange groups, and eluting said factor from said high molecular polysaccharide with a desorption solution having a sodium chloride concentration of from about 0.1 molar to 0.5 molar and a sodium phosphate concentration of from about 0.05 molar to about 0.2 molar.

3. In a process for preparing an erythropoietic factor concentrate, the steps of obtaining an active extract of the factor from a solution of blood plasma having a pH from about 4.2 to about 4.8 and a sodium chloride concentration of from about 0.03 molar to about 0.04 molar by sorption only of the factor on an insoluble substantially open-chain, high molecular polysaccharide containing ionic exchange groups, and eluting said factor from said high molecular polysaccharide with a desorption solution having a sodium chloride concentration of from about 0.1 molar to 0.5 molar and a sodium phosphate concentration of from about 0.05 molar to about 0.2 molar.

4. In a process for preparing an erythropoietic factor concentrate, the steps of obtaining an active extract of the factor from a solution of blood plasma having a pH from about 4.2 to about 4.8 and a sodium chloride concentration of from about 0.03 molar to about 0.04 molar by sorption only of the factor on an insoluble alkyl amino derivative of cellulose, and eluting said factor from said derivative with a desorption solution having a sodium chloride concentration of from about 0.1 molar to 0.5 molar and a sodium phosphate concentration of from about 0.05 molar to about 0.2 molar.

5. In a process for preparing an erythropoietic factor concentrate, the steps of obtaining an active extract of the factor from a solution of blood plasma having a pH from about 4.2 to about 4.8 and a sodium chloride concentration of from about 0.03 molar to about 0.04 molar by sorption only of the factor on an insoluble alkyl amino derivative of cellulose equilibrated to the pH and sodium chloride concentration of said solution of plasma, and eluting said factor from said derivative with a desorption solution having a sodium chloride concentration of from about 0.1 molar to 0.5 molar and a sodium phosphate concentration of from about 0.05 molar to about 0.2 molar.

6. In a process for preparing an erythropoietic factor concentrate, the steps of obtaining an active extract of the factor from a solution of blood plasma having a pH from about 4.2 to about 4.8 and a sodium chloride concentration of from about 0.03 molar to about 0.04 molar by sorption only of the factor on an insoluble substantially open-chain, high molecular weight polysaccharide containing anionic exchange groups and having a buffer-maintained pH from about 4.2 to about 4.8 and a sodium chloride concentration of from about 0.03 molar to about 0.04 molar, and eluting said factor from said high molecular polysaccharide with a desorption solution having a sodium chloride concentration of from about 0.1 molar to 0.5 molar and a sodium phosphate concentration of from about 0.05 molar to about 0.2 molar.

7. In a process for preparing an erythropoietic factor concentrate, the steps of obtaining an active extract of the factor from a solution of anemic sheep blood plasma having a pH from about 4.2 to about 4.8 and a sodium chloride concentration of from about 0.03 molar to about 0.04 molar by sorption only of the factor on an insoluble substantially open-chain, high molecular weight polysaccharide containing anionic exchange groups and having a buffer-maintained pH from about 4.2 to about 4.8 and a sodium chloride concentration of from about 0.03 molar to about 0.04 molar, and eluting said factor from said high molecular polysaccharide with a desorption solution having a sodium chloride concentration of from about 0.1 molar to 0.5 molar and a sodium phosphate concentration of from about 0.05 molar to about 0.2 molar.

8. In a process for preparing an erythropoietic factor concentrate, the steps of obtaining an active extract of the factor from a solution of anemic sheep blood plasma having a pH from about 4.2 to about 4.8 and a sodium chloride concentration of from about 0.03 molar to about 0.04 molar by sorption only of the factor on an insoluble substantially open-chain, high molecular weight polysaccharide containing anionic exchange groups and having a buffer-maintained pH from about 4.2 to about 4.8 and a sodium chloride concentration of from about 0.03 molar to about 0.04 molar, eluting said factor from said high molecular polysaccharide with a desorption solution having an acid pH and a sodium chloride concentration of from 0.1 molar to about 0.5 molar and a sodium phosphate concentration of from about 0.05 molar to about 0.2 molar.

References Cited in the file of this patent

Rambach: Blood, vol. 12, December 1957, pp. 1101–13.
Gordon: Pro. Soc. Exptl. Biol. Med., vol. 86, 1954, pp. 255–58.
JACS, 1956, vol. 78, pages 751–63.
Rambach: PSEP, vol. 98, July 1958, pp. 602–4.
Schmid: JACS, February 5, 1955, vol. 77, pp. 742–45.